(12) United States Patent
Chen et al.

(10) Patent No.: US 11,489,311 B2
(45) Date of Patent: Nov. 1, 2022

(54) OPTICAL AMPLIFIER

(71) Applicant: Lumentum Operations LLC, Milpitas, CA (US)

(72) Inventors: Guansan Chen, Milpitas, CA (US); Sheldon McLaughlin, Ottawa (CA)

(73) Assignee: Lumentum Operations LLC, San Jose, CA (US)

( * ) Notice: Subject to any disclaimer, the term of this patent is extended or adjusted under 35 U.S.C. 154(b) by 405 days.

(21) Appl. No.: 16/692,984

(22) Filed: Nov. 22, 2019

(65) Prior Publication Data

US 2021/0119402 A1    Apr. 22, 2021

Related U.S. Application Data

(60) Provisional application No. 62/924,330, filed on Oct. 22, 2019.

(51) Int. Cl.
*H01S 3/067* (2006.01)
*H01S 3/16* (2006.01)
*H01S 3/094* (2006.01)

(52) U.S. Cl.
CPC ...... *H01S 3/06754* (2013.01); *H01S 3/06704* (2013.01); *H01S 3/094003* (2013.01); *H01S 3/1608* (2013.01)

(58) Field of Classification Search
None
See application file for complete search history.

(56) References Cited

U.S. PATENT DOCUMENTS

| | | | | |
|---|---|---|---|---|
| 5,005,175 | A | * | 4/1991 | Desurvire ........... H01S 3/06754 372/71 |
| 6,560,269 | B1 | * | 5/2003 | Takehisa ............. H01S 3/08004 372/100 |
| 7,423,803 | B1 | * | 9/2008 | Chavez-Pirson ... H01S 3/06754 359/341.5 |
| 2016/0352066 | A1 | * | 12/2016 | Redding ................... G01J 3/10 |
| 2017/0222395 | A1 | * | 8/2017 | Guo ..................... H01S 5/02212 |
| 2019/0181605 | A1 | * | 6/2019 | Seo ....................... H01S 3/0941 |

* cited by examiner

*Primary Examiner* — Eric L Bolda
(74) *Attorney, Agent, or Firm* — Harrity & Harrity, LLP

(57) ABSTRACT

An optical amplifier may include an optical fiber to propagate a forward optical signal in a path of propagation of the optical amplifier. The optical fiber may have an input end face that is angled non-perpendicular to the path of propagation. The optical amplifier may include an optical component, in optical communication with the input end face of the optical fiber, to direct a backward optical emission away from the path of propagation.

20 Claims, 3 Drawing Sheets

OPTICAL AMPLIFIER

RELATED APPLICATION

This application claims priority to U.S. Provisional Patent Application No. 62/924,330, filed on Oct. 22, 2019 and entitled "IMPROVING DIRECTIVITY ON MICRO OPTICAL TECHNOLOGY FOR ERBIUM DOPED FIBER AMPLIFIER (EDFA) APPLICATION," the content of which is incorporated by reference herein in its entirety.

TECHNICAL FIELD

The present disclosure relates to optical amplifiers and, more particularly, to an amplified spontaneous emission (ASE) associated with an optical amplifier.

BACKGROUND

An optical amplifier is a device that is to receive signal light and generate amplified signal light (i.e., signal light with comparatively higher optical power). Typically, the optical amplifier provides optical amplification using a so-called gain medium, which is "pumped" (i.e., provided with energy) by a source, such as a pump laser. In some cases, the optical amplifier may utilize an optical fiber as a gain medium (such a device may be referred to as a fiber amplifier). In such a case, the gain medium may be a glass fiber doped with rare earth ions, such as erbium, neodymium, ytterbium, praseodymium, thulium, and/or the like. Such a fiber may be referred to as an active fiber. In operation, the signal light propagates through the active fiber together with pump light, and the active fiber outputs the amplified signal light that is generated from the signal light and the pump light. Generally, such optical amplifiers include other discrete components associated with controlling, enabling, and/or monitoring optical amplification. Such discrete components may include, for example, one or more isolators, a combiner (e.g., a wavelength division multiplexer (WDM)), a tunable filter, a tap, a photodiode, and/or the like.

SUMMARY

According to some implementations, an optical amplifier may include: an optical fiber to propagate a forward optical signal in a path of propagation of the optical amplifier, the optical fiber having an input end face that is angled non-perpendicular to the path of propagation; and an optical component, in optical communication with the input end face of the optical fiber, to direct a backward optical emission away from the path of propagation.

According to some implementations, an erbium doped fiber (EDF) amplifier may include: an EDF to propagate a forward optical signal in a path of propagation of the EDF amplifier, the EDF having an input end face that is angled relative to an output end face of the EDF; and an optical component, in optical communication with the input end face of the EDF, to direct a backward amplified spontaneous emission (ASE) away from the path of propagation.

According to some implementations, an optical system may include: an optical fiber having an input end face to receive a forward optical signal and an output end face, the input end face being angled relative to the output end face; and an optical component to receive a backward optical emission via the input end face of the optical fiber, the optical component being configured to direct the backward optical emission away from a path of the forward optical signal.

DETAILED DESCRIPTION

The following detailed description of example implementations refers to the accompanying drawings. The same reference numbers in different drawings may identify the same or similar elements.

A typical optical amplifier may use an optical fiber as a gain medium. For example, an erbium doped fiber (EDF) may be used as a gain medium for an EDF amplifier (EDFA). In some cases, pumping of the optical fiber may produce a backward emission, such as a backward ASE. The backward ASE may interfere with a forward optical signal that is to be amplified by the optical amplifier and/or interfere with other components of the optical amplifier. For example, the backward ASE may limit a gain of the forward optical signal that can be achieved by the gain medium. As another example, the backward ASE may be detected by a detector (e.g., a photodiode) that monitors the power produced by the optical amplifier, thereby causing inaccurate measurement.

Some implementations described herein provide an optical amplifier configured to redirect, block, and/or absorb a backward emission, such as a backward ASE. In some implementations, an optical fiber of the optical amplifier may include an input end face that is angled, such as angled non-perpendicular to a path of propagation of a forward optical signal, thereby causing the backward ASE to be directed away from the path of propagation. In some implementations, the angled input end face of the optical fiber may direct the backward ASE to an optical component that provides further direction of the backward ASE away from the path of propagation, causes blockage of the ASE, causes absorption of the ASE, and/or the like. In this way, the optical amplifier may reduce or eliminate interference caused by the backward ASE, thereby improving the gain of the forward optical signal, improving power monitoring by a detector of the optical amplifier, and/or the like.

Figure 1:
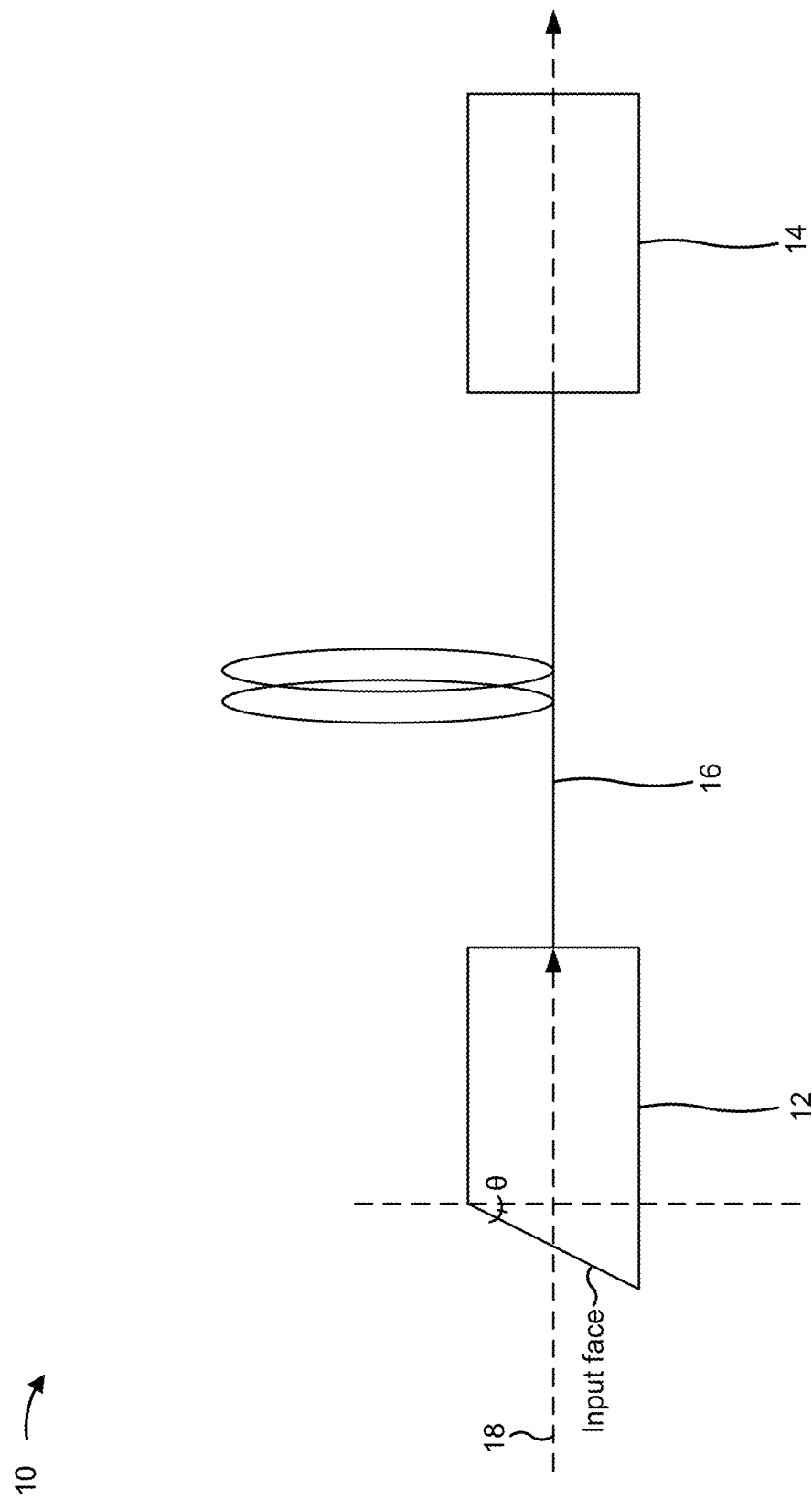
FIG. 1 is a diagram of an example optical fiber described herein.

FIG. 1 is a diagram of an example optical fiber 10 described herein. In some implementations, optical fiber 10 may be used as a gain medium for an optical amplifier. For example, optical fiber 10 may be a glass-doped fiber, such as an EDF. Additionally, or alternatively, optical fiber 10 may be used as an output optical fiber associated with the optical amplifier. For example, optical fiber 10 may be a glass fiber. In some implementations, optical fiber 10 may be a single-mode optical fiber.

Optical fiber 10 may include an input portion 12 and an output portion 14. In some implementations, input portion 12 and output portion 14 may be bare EDF spliced to pigtail fiber 16. Alternatively, input portion 12 and output portion 14 may be respective end portions of a glass ferrule. In use, input portion 12 may receive a forward optical signal (i.e., an optical signal that enters optical fiber 10 at input portion 12 and exits optical fiber 10 at output portion 14) that is propagated via the optical fiber 10 along a path of propagation 18. For example, the path of propagation 18 may be a path extending axially through input portion 12 and output portion 14 (e.g., a path along a fiber axis of optical fiber 10).

Input portion 12 may have an input face that is angled. In some implementations, the input face of input portion 12 may be angled non-perpendicular relative to a body of input portion 12. In some implementations, the input face of input portion 12 may be angled non-perpendicular relative to the path of propagation 18. In some implementations, the input face of input portion 12 may be angled relative to an output face of output portion 14. For example, the output face of output portion 14 may be non-angled, such as perpendicular to a body of output portion 14 and/or the path of propagation 18.

The input face of input portion 12 may be angled at an angle θ relative to a line perpendicular to the body of input portion 12, relative to a line perpendicular to the path of propagation 18, relative to the output face of output portion 14, and/or the like. Angle θ may be between 2-20 degrees, between 3-16 degrees, between 4-11 degrees, between 5-10 degrees, or another value that would result in an entry angle of the forward input signal that satisfies an acceptance angle of optical fiber 10. For example, angle θ may be less than or equal to 15 degrees (e.g., when optical fiber 10 has a numerical aperture of 0.14) or less than or equal to 20 degrees (e.g., when optical fiber 10 has a numerical aperture of 0.21). In this way, the input face of input portion 12 may direct a backward ASE away from the path of propagation 18, while minimizing coupling loss at optical fiber 10.

As indicated above, FIG. 1 is provided merely as an example. Other examples may differ from what is described with regard to FIG. 1.

Figure 2:
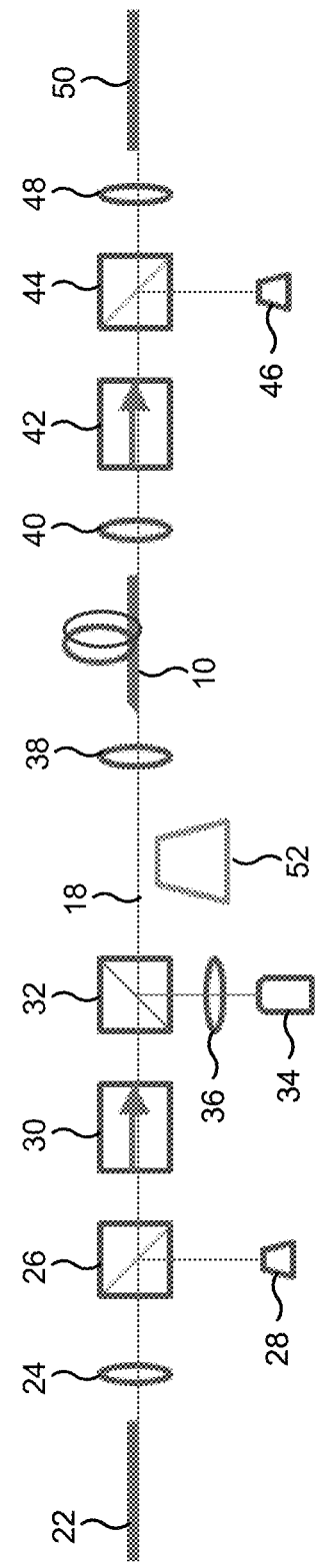
FIG. 2 is a diagram of an example optical amplifier described herein.

FIG. 2 is a diagram of an example optical amplifier 20 described herein. In some implementations, optical amplifier 20 may be an EDFA. In some cases, a forward optical signal (i.e., an optical signal that enters optical amplifier 20 at input optical fiber 22 and exits optical amplifier 20 at output optical fiber 50) may be propagated through optical amplifier 20 along the path of propagation 18. In this case, the path of propagation 18 may be a path extending axially through optical amplifier 20 (e.g., a path along an axis of optical amplifier 20), such as an axial path defined by input optical fiber 22 and output optical fiber 50.

The forward optical signal may enter the optical amplifier 20 at input optical fiber 22 and may propagate through an input lens 24. From input lens 24, the forward optical signal may propagate through an input tap filter 26. Input tap filter 26 may be associated with an input detector configured to monitor the forward optical signal. For example, the input detector may be an input monitor photodiode 28 that monitors a power of the forward optical signal (e.g., before amplification). From input tap filter 26, the forward optical signal may propagate through an input isolator 30 followed by a combiner 32 (e.g., a WDM). Combiner 32 may be associated with a pump source 34 (e.g., a pump laser) and a pump lens 36. The pump source 34 may be configured to produce pump energy that is to provide pumping to the gain medium of optical amplifier 20. Accordingly, the pump energy may be combined (e.g., multiplexed) with the forward optical signal at combiner 32.

As shown in FIG. 2, optical fiber 10 (e.g., an EDF) may be the gain medium of optical amplifier 20. The forward optical signal, as well as the combined pump energy, may propagate through optical fiber 10 via an input lens 38. In some cases, pumping of the gain medium may result in an ASE, such as a backward ASE that may propagate through optical amplifier 20 in a direction opposite to the forward optical signal. In some implementations, input lens 38 may be an aspheric lens. The forward optical signal exiting optical fiber 10 may propagate through an output lens 40 followed by an output isolator 42 and an output tap filter 44. Output tap filter 44 may be associated with an output detector configured to monitor the forward optical signal. For example, the output detector may be an output monitor photodiode 46 that monitors a power of the forward optical signal (e.g., after amplification). From the output tap filter 44, the forward optical signal may propagate through an output lens 48 before exiting optical amplifier 20 at output optical fiber 50. In some implementations, output optical fiber 50 may correspond to optical fiber 10 (e.g., in addition to, or instead of, the gain medium corresponding to optical fiber 10).

In some implementations, optical amplifier 20 may include one or more optical components 52. Optical component 52 may be configured to direct a backward ASE away from the path of propagation 18. Accordingly, optical component 52 may be positioned in optical amplifier 20 beside the path of propagation 18, such that the forward optical signal is not propagated through optical component 52. In some implementations, an optical component 52 may be positioned before input lens 38 (e.g., after combiner 32) in the direction of the forward optical signal. Alternatively, optical component 52 may be positioned after input lens 38 and before optical fiber 10 in the direction of the forward optical signal. In some implementations, an optical component 52 may be positioned before output lens 48 (e.g., after output tap filter 44) or after output lens 48 (e.g., before output optical fiber 50) in the direction of the forward optical signal (e.g., when output optical fiber 50 corresponds to optical fiber 10).

Optical component 52 may be in optical communication with the input face of optical fiber 10 (or an input face of output optical fiber 50 when output optical fiber 50 corresponds to optical fiber 10). For example, optical component 52 may have a surface that is in optical communication with the input face of optical fiber 10. In some implementations, the surface of optical component 52 may be angled to direct a backward ASE away from the path of propagation 18. For example, the surface of optical component 52 may be angled relative to a line perpendicular to the path of propagation 18. As another example, the surface of optical component 52 may be angled relative to the input face of optical fiber 10.

Optical component 52 may be composed of a material that has a higher refractive index than air (e.g., dry air at sea level) at a particular temperature and pressure. For example, optical component 52 may be composed of glass (e.g., crown glass, borosilicate glass, silica glass, another glass with an Abbe number from 50-85, and/or the like).

As indicated above, FIG. 2 is provided merely as an example. Other examples may differ from what is described with regard to FIG. 2.

Figure 3:
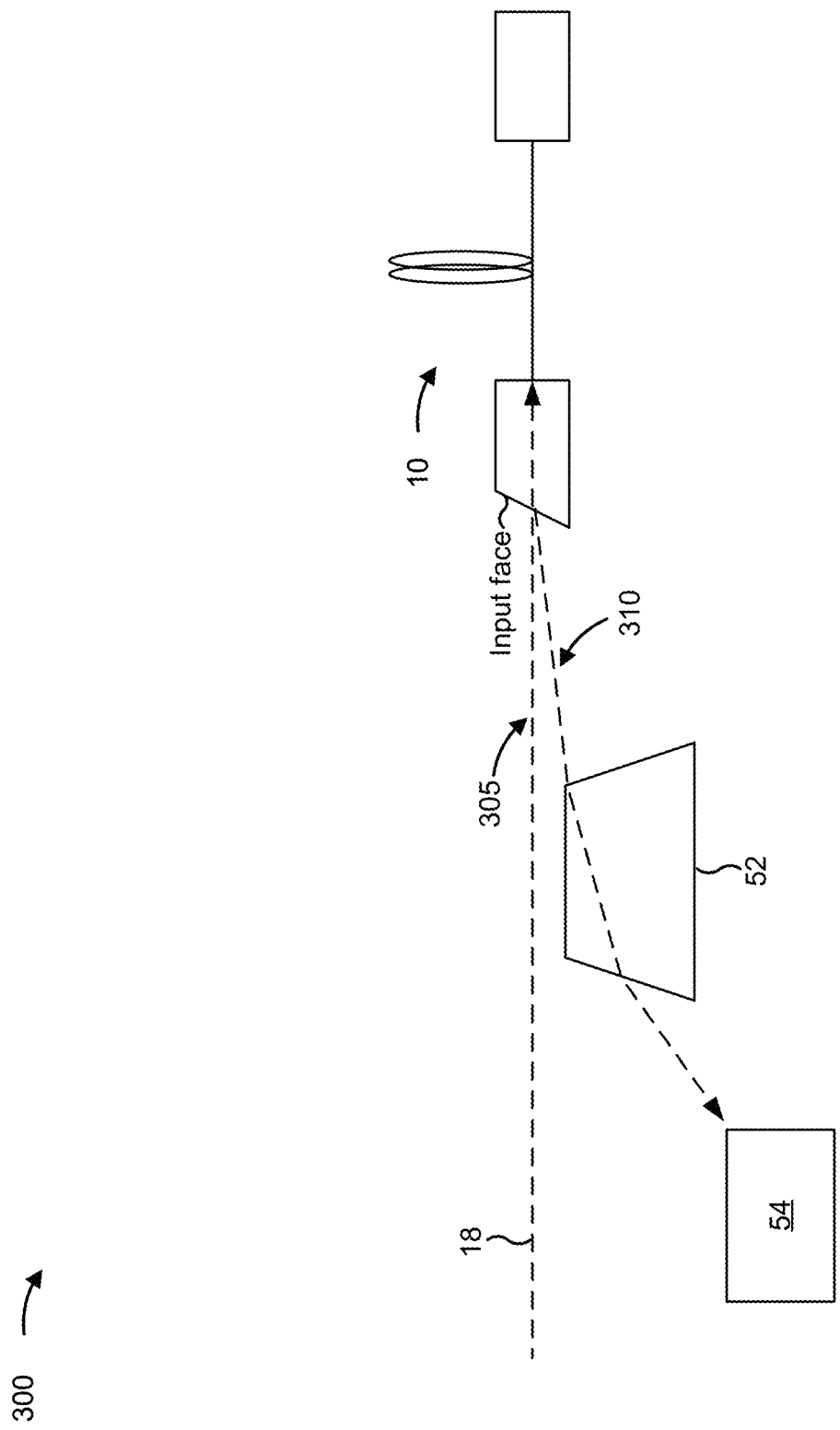
FIG. 3 is a diagram of an example implementation described herein.

FIG. 3 is a diagram of an example implementation 300 described herein. In particular, FIG. 3 shows an optical system that includes optical fiber 10 and optical component 52. As shown in FIG. 3, a forward optical signal 305 may propagate through optical fiber 10 along the path of propagation 18. As described above, optical fiber 10 may be the gain medium of optical amplifier 20, and pumping of the gain medium may result in an ASE, such as a backward ASE 310 in a direction opposite to forward optical signal 305.

As shown in FIG. 3, the angled input face of optical fiber 10 may direct backward ASE 310 away from the path of propagation 18 and toward optical component 52. Moreover, one or more angled surfaces of optical component 52 may further direct backward ASE 310 away from the path of propagation 18. For example, optical component 52 may direct backward ASE 310 away from a detector of optical amplifier 20, such as input monitor photodiode 28 and/or output monitor photodiode 46 (e.g., when output optical fiber 50 corresponds to optical fiber 10).

In some implementations, optical component 52 may direct backward ASE 310 to an attenuation component 54. Attenuation component 54 may be configured to attenuate (e.g., block, absorb, trap, and/or the like) backward ASE 310. For example, attenuation component 54 may include a material that attenuates light, such as a blackout (e.g., opaque) fabric.

In this way, optical fiber 10 and optical component 52 may reduce or eliminate interference caused by backward ASE 310, such as interference with forward optical signal 305 and/or interference with measurements taken by monitor photodiodes 28, 46. Accordingly, optical fiber 10 and optical component 52 may improve a gain of forward optical signal 305 that is achievable by optical amplifier 20 and/or reduce inaccuracies associated with monitor photodiodes 28, 46.

As indicated above, FIG. 3 is provided merely as an example. Other examples may differ from what is described with regard to FIG. 3.

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical amplifier, comprising:
   an optical fiber to propagate a forward optical signal in a path of propagation of the optical amplifier,
   the optical fiber having an input end face that is angled non-perpendicular to the path of propagation; and
   an optical component, in optical communication with the input end face of the optical fiber, to direct a backward optical emission away from the path of propagation,
   wherein the optical component is positioned relative to the path of propagation such that the forward optical signal is not propagated through the optical component.

2. The optical amplifier of claim 1, wherein the optical fiber is erbium doped fiber.

3. The optical amplifier of claim 1, wherein the backward optical emission is an amplified spontaneous emission.

4. The optical amplifier of claim 1, wherein the optical component is positioned before an input lens for the optical fiber in a direction of the forward optical signal.

5. The optical amplifier of claim 1, wherein the optical component is positioned before the optical fiber and after an input lens for the optical fiber in a direction of the forward optical signal.

6. The optical amplifier of claim 1, wherein the optical component is to direct the backward optical emission away from a detector of the optical amplifier.

7. The optical amplifier of claim 1, wherein the input end face of the optical fiber is to direct the backward optical emission to the optical component.

8. The optical amplifier of claim 1, wherein the input end face of the optical fiber is angled from 4 to 11 degrees relative to a line perpendicular to the path of propagation.

9. An erbium doped fiber (EDF) amplifier, comprising:
   an EDF to propagate a forward optical signal in a path of propagation of the EDF amplifier,
   the EDF having an input end face that is angled relative to an output end face of the EDF; and
   an optical component, in optical communication with the input end face of the EDF, to direct a backward amplified spontaneous emission (ASE) away from the path of propagation,
   wherein the optical component is positioned relative to the path of propagation such that the forward optical signal is not propagated through the optical component.

10. The EDF amplifier of claim 9, wherein the input end face of the EDF is non-perpendicular to the path of propagation, and the output end face of the EDF is perpendicular to the path of propagation.

11. The EDF amplifier of claim 9, wherein the optical component is positioned before an input lens for the EDF in a direction of the forward optical signal.

12. The EDF amplifier of claim 9, wherein the optical component is positioned before the EDF and after an input lens for the EDF in a direction of the forward optical signal.

13. The EDF amplifier of claim 9, wherein the input end face of the EDF is to direct the backward ASE to the optical component.

14. The EDF amplifier of claim 9, wherein a surface of the optical component is in optical communication with the input end face of the EDF, and
   wherein the surface is angled relative to the input end face of the EDF.

15. An optical system, comprising:
   an optical fiber having an input end face to receive a forward optical signal and an output end face,
   the input end face being angled relative to the output end face; and
   an optical component to receive a backward optical emission via the input end face of the optical fiber, the optical component being configured to direct the backward optical emission away from a path of the forward optical signal, and the optical component being positioned relative to the path of propagation such that the forward optical signal is not propagated through the optical component.

16. The optical system of claim 15, wherein the optical fiber is erbium doped fiber.

17. The optical system of claim 15, wherein the backward optical emission is an amplified spontaneous emission.

18. The optical system of claim 15, wherein the input end face of the optical fiber is angled from 4 to 11 degrees relative to the output end face of the optical fiber.

19. The optical system of claim 15, wherein the optical component, at a temperature and a pressure, has a higher refractive index than air at the temperature and the pressure.

20. The EDF amplifier of claim 9, wherein the optical component is to direct the backward ASE away from a detector of the EDF amplifier.

* * * * *